Patented Dec. 27, 1932

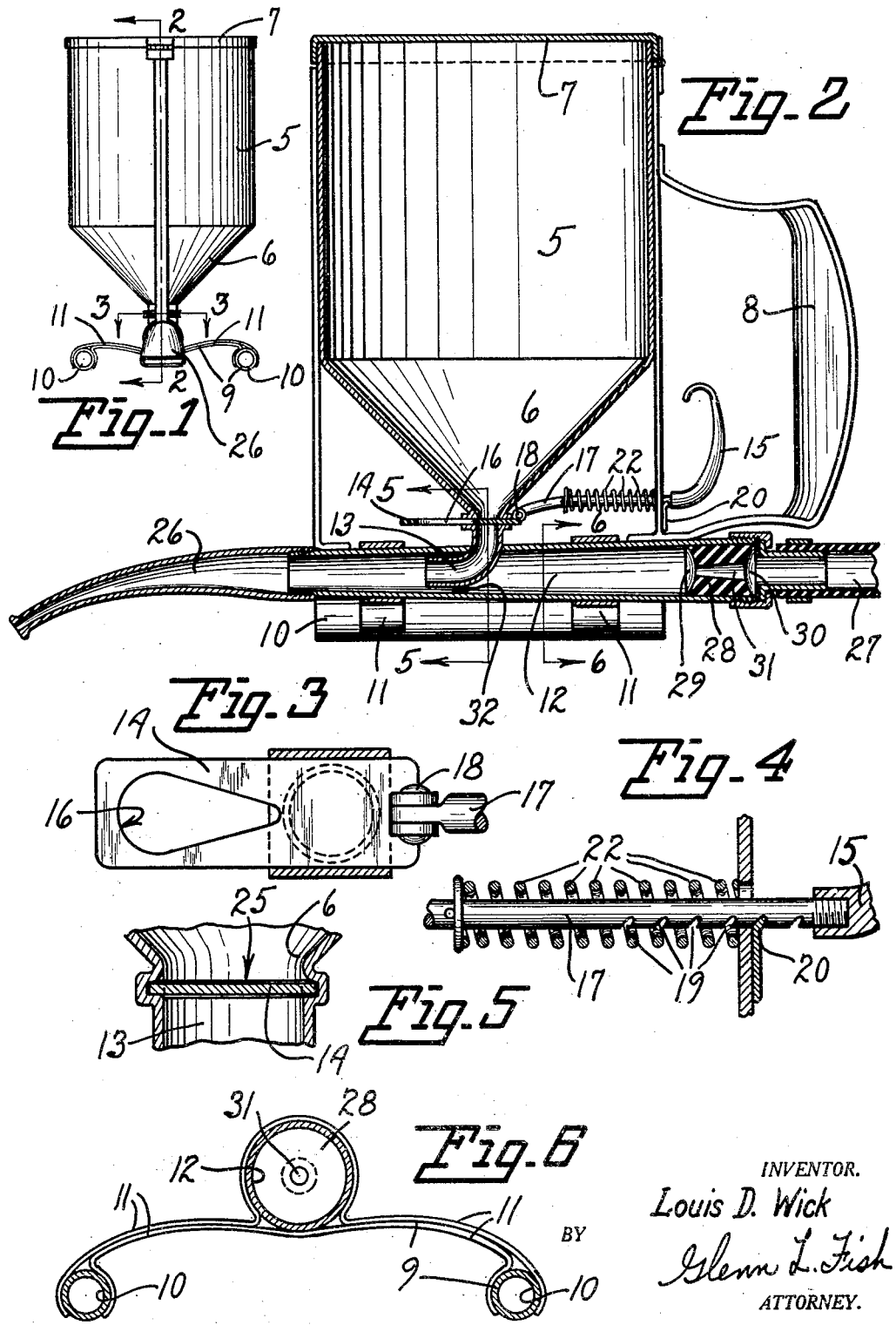

1,892,260

UNITED STATES PATENT OFFICE

LOUIS D. WICK, OF SPOKANE, WASHINGTON, ASSIGNOR TO FRANK J. GAINELLI, OF SPOKANE, WASHINGTON

PNEUMATIC DASH GUN

Application filed January 17, 1931. Serial No. 509,355.

My invention relates to pneumatic dash guns and certain objects are to provide an apparatus for applying a stucco finish which may consist of an aggregate of sand, cement, water, or the like applied to the walls of buildings or other surfaces. Further objects of the invention are to provide an apparatus through which decorative materials, such as dashes consisting of colored crushed rock of various sizes or sand applied to a prepared base of either cement or magnesite. The apparatus may also be used for applying liquids such as paint, or the like; and further objects are to provide an apparatus consisting of a container, a delivery nozzle, and means whereby the air is applied to the nozzle to create a vacuum on the pipe through which the plastic material is drawn.

With the above and other objects in view which will appear as the description proceeds, the invention consists of the novel construction, adaptation, combination and arrangement of parts hereinafter described and claimed. These objects are accomplished by devices illustrated in the accompanying drawing; wherein:—

Figure 1 is a view in front elevation showing the supporting means;

Figure 2 is a view in cross section taken on line 2—2 of Fig. 1, showing the construction of the operating parts;

Figure 3 is a plan view of the valve mechanism taken on line 3—3 of Figure 1;

Figure 4 is a view in cross section of the valve locking means;

Figure 5 is an enlarged fragmentary view of the valve shown in combination with its guides, taken substantially on a line 5—5 of Figure 2; and Figure 6 is an enlarged view of the supporting mechanism taken on line 6—6 of Figure 2.

Referring to the drawing throughout which like reference numerals indicate like parts, the numeral 5 designates a receptacle of circular shape, and having a conical lower portion 6. The receptacle is provided with a cover 7, a handle 8, and supporting means 9. The supporting means 9 consists of tubular members 10 suspended from spring arms 11. The members 11 are securely fastened to the delivery pipe 12, and thus support the container.

An L-shaped pipe 13 extends from the conical bottom 6 into the air pipe 12 through which the substance from the container is delivered into the air stream.

A quick acting valve 14 is provided at the lower end of the receptacle, which is used for controlling the flow. The valve is supported and guided through a slot 25, and is shown in the different views closed. A connecting link 17 pivoted at 18 to the valve and securely fastened to a handle 15 supplies the means for controlling the valve.

To open the valve, the handle 15 is raised upward, releasing the link 17 from its locked position and rearwardly toward the handle 8. This action permits the material to flow through the V-shaped openings 16, as desired. The locking mechanism consists of slots or notches 19 placed in the lower side of the connecting link 17 that contacts with a hook 20. As shown in Figure 4, the link is retained in locked position by a spring 22.

The flow of the material is controlled through a graduated slot 16 which permits the apparatus to receive the desired amount through the nozzle 26.

The air is supplied from any suitable source under pressure through a hose or flexible tube 27 which is fastened with a suitable connection to tapered pipe 12.

The pipe 12 is provided with a member 28 having concaved portions 29 and 30 on either end and connected with a tapered hole 31. As the air contacts with the concave 30, a whirling motion is created in the air stream and after passing through the nozzle 31, a similar action is caused by the concave 29.

As the air passes in a circular motion through the port 32 which extends completely around the discharge pipe 13, a vacuum is created on the said pipe causing the material to be drawn from container and delivered through the nozzle 26 to the surface being coated.

The nozzle 26 is curved and free on its connection to be turned at any desired angle, it being understood that for different classes of work nozzles of different shapes will be required.

It will now be evident that I have provided a simple, economical and effective device for the purpose described. Having thus described my invention, it being understood that minor changes may be resorted to in its construction and arrangement without departing from the scope and spirit of the invention, what I claim and desire to secure by Letters Patent of the United States is:—

A pneumatic dash gun having in combination a receptacle adapted to contain a plastic substance, and having a conical bottom portion, an L-shaped discharge pipe connected to the bottom, a discharge regulating valve comprising a plate having a V-shaped opening slidably installed through a slot transversely of the discharge pipe, means for locking said valve in various positions whereby its V-slot permits a greater or less discharge from the receptacle, a delivery pipe connected to the bottom of the receptacle, the lower reach of the L-shaped discharge pipe projecting into the delivery pipe and in alignment therewith leaving a space between the discharge and delivery pipes, a discharge nozzle for the delivery pipe, a flexible supply pipe for projecting compressed air through the delivery pipe whereby suction is created in the L-shaped discharge pipe, and a conically orificed plug within the delivery pipe having concave ends whereby a whirling motion is imparted to compressed air in its passage through the delivery pipe.

In testimony whereof I affix my signature.

LOUIS D. WICK.

CERTIFICATE OF CORRECTION.

Patent No. 1,892,260.  December 27, 1932.

LOUIS D. WICK.

It is hereby certified that the above numbered patent was erroneously issued to "Frank J. Gainelli, of Spokane, Washington," as assignee of the entire interest in said invention, whereas said patent should have been issued to the inventor, said "Wick", and "Frank J. Gainelli, of Spokane, Washington," said "Gainelli" being assignee of one-third interest only, as shown by the records of assignments in this office; and that the said Letters Patent should be read with this correction therein that the same may conform to the record of the case in the Patent Office.

Signed and sealed this 23rd day of May, A. D. 1933.

M. J. Moore.

(Seal)  Acting Commissioner of Patents.